Patented Dec. 22, 1953

2,663,620

UNITED STATES PATENT OFFICE 2,663,620

PREPARATION OF ALUMINA FROM ALUMINUM CHLORIDE HEXAHYDRATE

Vladimir Haensel, Hinsdale, Ill., assignor to Universal Oil Products Company, Chicago, Ill., a corporation of Delaware No Drawing. Application October 29, 1949, Serial No. 124,509

3 Claims. (Cl. 23—142)

This invention relates to the manufacture and use of catalytic materials and more particularly to a novel method of preparing aluminum oxide and to the use thereof, preferably as a component in catalysts for hydrocarbon conversion reactions.

The preparation of alumina as at present practiced entails the addition of a basic reagent to aluminum chloride hexahydrate. The resultant precipitate is washed and filtered to remove undesirable impurities. However, in a recently discovered process, referred to in the art as "platforming," the catalyst contains very small amounts of activating components. This means that the alumina, which comprises a major proportion of the catalyst, must be thoroughly washed to remove undesirable impurities because the presence of even small amounts of impurities may prove detrimental to the activity and other properties of the catalyst. For example, when the catalyst contains 0.1–0.3% of activating components, the presence of impurities within a similar range will tend to mask or offset the effect of the activating components.

When alumina is prepared from the commercially available aluminum chloride hexahydrate, the precipitated alumina requires extensive washing and filtration in order to remove the impurities. The present invention offers a novel method of preparing alumina which is more readily susceptible to washing and filtration and thereby reduces the time and expense hereinbefore entailed in purifying the alumina.

In one embodiment the present invention relates to a method of preparing alumina which comprises heating aluminum chloride hexahydrate under conditions to liberate hydrogen chloride, and thereafter commingling a basic reagent under conditions to precipitate alumina.

In accordance with the present invention aluminum chloride hexahydrate is heated at a temperature and for a time sufficient to effect decomposition thereof and to liberate hydrogen chloride. At the same time, steam also will be evolved. When it is desired to start with anhydrous aluminum chloride, water may be commingled with the anhydrous aluminum chloride to form a hydrated aluminum chloride for treatment in accordance with the present invention. In another embodiment the charge may comprise a slurry of anhydrous aluminum chloride in a saturated solution of aluminum chloride hexahydrate.

The exact temperature to be employed in the heating step will be correlated with the time of heating. Higher temperatures will be required with shorter times of heating and vice versa. The temperature also will be dependent upon the pressure employed in order to insure the desired volitalization. In general, the temperature to be employed in the heating step will be within the range of from about 225° to about 600° F. or more and the time will be within the range of from about 2 to 100 hours or more.

The exact composition of the resultant product has not been definitely established but it is believed to contain aluminum oxychloride, alumina and an association of aluminum and chlorine. In general, the higher temperature and longer time of heating will liberate more hydrogen chloride and, therefore, will produce a product containing less combined chlorine. With severe heating, the product may be substantially free from chlorine and consist primarily of alumina. In any event, the product will contain less chlorine than in the original aluminum chloride hexahydrate.

When desired, the amount of chlorine present in this product may be further reduced by any suitable means. A particularly satisfactory method is by an ion exchange reaction, including the use of ammonium nitrate for this purpose. When the product is substantially free from chlorine, as produced either by the heating step or by the ion exchange reaction, it will comprise alumina and, therefore, will not require the use of a basic precipitating agent. The alumina so prepared may be utilized in the manner to be hereafter set forth in detail.

It will be noted that in this operation chlorine is removed as hydrogen chloride and, therefore, this process has the additional advantage of permitting the ready recovery of an aqueous hydrogen chloride solution which is a valuable product. Further, in view of the fact that the chlorine content of the resultant alumina is reduced, less basic reagent as, for example, ammonium hydroxide, ammonium carbonate, etc., will be required to precipitate alumina than would be required when the alumina is precipitated from commercial aluminum chloride hexahydrate, and this entails a considerable savings in cost in the operation of the process. Still another advantage to the present process is that, because less ammonia is utilized for precipitating the alumina, less ammonium chloride is formed. Ammonium chloride at present does not find a ready market and, therefore, the present process offers the additional advantage of recovering valuable aqueous hydrogen chloride as compared to less valuable ammonium chloride.

The heating of the aluminum chloride hexahydrate is effected in any suitable zone having an outlet for the simultaneous removal of the volatilized materials. For example, the aluminum chloride hexahydrate may be disposed in a vessel and heated therein or, in another embodiment, it may be loaded on a moving belt and passed through a heating zone. The volatilized materials, comprising hydrogen chloride and steam, may be condensed and recovered in any suitable manner. The solid product remaining after the heating step, may be utilized in any desired manner. Because this product, in one embodiment of the invention, comprises aluminum and chlorine, it may be utilized, preferably when dissolved in a suitable solvent such as aluminum chloride or other acidic solvent, as a catalyst for the well known Friedel-Crafts and other reactions including the alkylation of aromatics with olefins, alcohols, etc., the alkylation of isoparaffins, polymerization of olefins, isomerization of paraffins, etc.

As hereinbefore set forth, a particularly preferred use of the product from the heating operation is in the preparation of alumina. When the product contains chlorine, alumina is readily prepared by adding a suitable basic reagent such as ammonium hydroxide, ammonium carbonate, etc. Alumina prepared in this manner will require less ammonia for precipitation than would be required when precipitating alumina from conventional aluminum chloride and also will form less ammonium chloride, as hereinbefore set forth.

In one embodiment of the invention the precipitation of the alumina may be accomplished by adding dilute ammonium hydroxide. The resultant alumina will be a gelatinous mass which is preferably slurried with water and then washed and filtered in a conventional manner. The wash water preferably contains a small amount of ammonium hydroxide as this has been found to further facilitate the washing and filtering operations.

In another embodiment of the invention the precipitation of alumina may be accomplished by the use of concentrated ammonium hydroxide. The resultant product will comprise fine granules, and the granules may be slurried with water and then subjected to washing and filtering as aforesaid.

As will be shown by the data in the following example, the filtering of alumina prepared in accordance with the present invention is more readily accomplished then the filtering of alumina prepared by the prior methods. This improved washing and filtering of the alumina considerably reduces the cost of the manufacture of the alumina, not only in time and effort saved in effecting these operations, but also in a considerable savings in the cost of the washing and filtering equipment. Smaller size equipment may be used to accomplish the same results than has been required in the past.

In another embodiment of the invention, the product from the heating step may be utilized to form spherical shaped alumina particles. This may be accomplished by forming an emulsion or colloidal solution of the product from the heating step and, under proper conditions, the resultant sol will have the properties of setting to a gel upon the addition of a suitable basic reagent. The mixture of sol and basic reagent may then be distributed in the form of droplets, either through an orifice or from a rotating disk, into a body of immiscible liquid wherein the resultant alumina sets into spherically shaped gel particles. Suitable immiscible liquids include petroleum oils and particularly Nujol, etc. The alumina spheres may be transferred from the gel forming zone by means of water or other carrying medium for subsequent washing and processing.

The alumina prepared in the above manner may be used for any purpose for which alumina is suitable, such as a dessicant, desulfurizing agent, dehydrohalogenating agent, etc. but, as hereinbefore set forth, it is particularly suitable for use as a component for hydrocarbon conversion catalysts. The alumina, prepared in the above manner, is especially suitable for use as a component in the "platforming" catalyst. The "platforming" catalyst comprises as association of alumina, platinum and halogen, the halogen and platinum being combined with each other and/or with the alumina. The catalyst contains from about 0.01% to about 1% by weight of platinum and from about 0.1% to about 8% by weight of halogen, preferably from about 0.1% to about 3% by weight of combined fluorine. In another embodiment the halogen content of the catalyst comprises a mixture of fluorine and chlorine, the total amount of halogen being within the range of from about 0.1% to about 8% by weight of the alumina.

A particularly preferred method of adding the fluorine is in the form of hydrogen fluoride and to add the hydrogen fluoride in the desired concentration to the last washing and filtering step. The final wash is effected with water, ammonium hydroxide being added to the water only in the preceding washes. The mixture of alumina and halogen is then dried at a temperature of from about 200° to about 500° F. for a period of from about 2 to 24 hours or more, after which it is composited with a suitable lubricant such as sterotex, graphite, hydrogenated coconut oil, etc., formed into pills of desired size and shape, and then calcined at a temperature of from about 800° to about 1400° F. for a period of about 2 to 12 hours or more.

When the catalyst is to contain combined chlorine, this method has the advantage of permitting more careful control of the chlorine content of the catalyst than by attempting to utilize the chlorine originally present in the aluminum chloride. However, as hereinbefore set forth, the preferred catalyst also contains combined fluorine and, therefore, the chlorine content must be reduced to below that present in the aluminum chloride hexahydrate.

Platinum is composited with the alumina and halogen in any suitable manner. In a preferred method, platinum in the form of chloroplatinic acid, tetra-amino-platino chloride, ammonium-platino-nitrite or other suitable platinum compound, containing a small amount of ammonium hydroxide, is commingled with the alumina halogen, and the resultant composite is then evaporated to dryness. When desired, the aluminum-halogen may be suspended in the platinum solution and the excess liquid removed by draining. It is understood that the halogen and platinum may be composited with the alumina in any other suitable manner as, for example, compositing the halogen and platinum in a single step with the alumina or first compositing the platinum with the alumina and subsequently adding the halogen. In any event, the final composite is washed, dried at a temperature of from about 200° to about 500° F. for a period of from about 2 to 24 hours or more and finally calcined in air at a temperature of from about 600° to about 1000° F. for a period of from about 2 to 12 hours or more.

The alumina, as prepared in the manner hereinbefore set forth, is also particularly suitable for use in the preparation of dehydrogenation and aromatization catalysts comprising aluminum and from about 5 to about 25% by weight of a compound and particularly an oxide of the metals in the left hand column of groups 4, 5 and 6 of the Periodic Table. Particularly suitable catalysts of the class include alumina-chromia, alumina-molybdena, alumina-vanadia, etc. Still other satisfactory catalysts containing alumina include the well known cracking catalyst comprising a major proportion of silica and a minor proportion of alumina.

The catalyst used in the platforming process is generally employed for the reforming of a substantially saturated gasoline of low antiknock value, such as straight run gasoline and natural gasoline, at a temperature of from about 800° to about 1000° F. and a superatmospheric pressure ranging from about 100 to 1000 pounds or more, per square inch. Dehydrogenation and aromatization catalysts comprising alumina and compounds of metals in groups 4, 5 and 6 of the Periodic Table are generally utilized at a temperature of from about 800° to about 1200° F. and a pressure ranging from atmospheric to 100 pounds or more. The silica-alumina catalyst utilized in the cracking of petroleum oils is generally employed at a temperature of from about 800° to about 1000° F. and a pressure of from atmospheric to 500 pounds or more per square inch.

The following examples are introduced to illustrate further the novelty and utility of the present invention but not with the intention of unduly limiting the same.

EXAMPLE I

A batch of aluminum chloride hexahydrate was heated at about 300° F. for about 66 hours, with a resultant loss in weight of 56.4%. The batch was heated additionally at 320° F. for 24 hours to give a further loss in weight of 5%, making a total loss in weight of 61.4%. The resultant product was treated with concentrated ammonium hydroxide (28% NH₃), followed by the addition of water and mixing. The resultant slurry was filtered and washed with water containing a small amount of ammonium hydroxide. A total of 7 washes and filtrations utilizing water containing ammonium hydroxide were employed. An aqueous hydrogen fluoride solution, in a concentration of about 0.3% by weight of the alumina on a dry basis was added to the wash water for the 8th wash, after which the product was again filtered. It was observed throughout the operation that the filtering proceeded extremely rapidly, in contrast to the filtering of alumina prepared from commercial aluminum chloride hexahydrate.

The improved filtering obtained in accordance with the present invention is shown by the data in the following table which compares this filtering with the filtering of alumina prepared from alumina chloride hexahydrate. The data in this table are presented on the basis of 75 grams of alumina in the final product. The amount of water used was selected in order to give a substantially uniform thickness of filter cake.

Table I

| | Alumina from heated and decomposed aluminum chloride hexahydrate | Alumina from unheated and undecomposed aluminum chloride hexahydrate |
|---|---|---|
| Water used in each wash____cc__ | 1,000 | 2,500 |
| Filter area_____ | 1.0 | 5.54 |
| Time of filtration in minutes, for wash number: | | |
| 1_____ | 2 | 39 |
| 2_____ | 2 | 18 |
| 3_____ | 2 | 12 |
| 4_____ | 2 | 15 |
| 5_____ | 2 | 13 |
| 6_____ | 2 | 19 |
| 7_____ | 2 | 15 |
| 8_____ | 2 | 20 |
| Average filtration time (in minutes)___ | 2 | 19 |
| Thickness of filter cake, average (in inches)_____ | 1 | 0.8 |

The solids in the wet filter cake mounted to 24.3% by weight for the alumina prepared from the heated and decomposed aluminum chloride hexahydrate and only to 7.9% for the alumina prepared from the unheated and undecomposed aluminum chloride hexahydrate. The filter cake from the heated and decomposed aluminum chloride hexahydrate broke up into a powder upon drying and did not require grinding prior to pilling.

It will be noted from the data in the above table that filtering of the alumina prepared in accordance with the present invention required an average of only 2 minutes per filtration as compared to an average of 19 minutes for the conventional preparation. Also, it will be noted that the improved process of the present invention required only 1000 cc. of water per wash as compared to 2500 cc. for the conventional method.

The overall filtration results indicate a considerable improvement by the use of the heated and decomposed aluminum chloride hexahydrate. The increase in filtration rate is represented by a factor of $$\frac{\text{(filter area ratio)(filtration time ratio)}}{\text{wash water ratio}} =$$

$$5.54 \times \frac{19}{2} \times \frac{1000}{2500} = 21$$

which indicates a very large reduction in the size of equipment. This is extremely important from a commercial view point because in many cases the washing and filtration step of the process comprises the bottle neck in catalyst manufacture.

The filtered alumina cake, prepared in the above manner, was dried at a temperature of about 340° F. for 16 hours and, as hereinbefore set forth, the dried material broke up into a powder. A Sterotex lubricant was added and the mixture was pilled into pellets of uniform size and shape. The pellets were calcined at a temperature of from about 1200° F. for 3 hours, after which the pellets were suspended in an ammoniacal solution of chloroplatinic acid in an amount of 0.3% by weight based on the dry alumina. The composite was heated to dryness and then was calcined at a temperature of about 930° F. for 2 hours.

The catalyst as prepared in the above manner was utilized for the reforming of a Mid-Continent naphtha having a boiling range of from 220° to 400° F., an A. S. T. M. Motor Method clear octane number of 33.5 which, upon the addition of 3 cc. of tetraethyl lead increased to 58.3, and an A. S. T. M. Research Method clear octane number of 30 which, upon the addition of 3 cc. of tetraethyl lead, increased to 58.9. The naphtha contained 8.9% of aromatics. The reforming operation was effected at an average catalyst temperature of about 850° F., a hydrogen to hydrocarbon ratio of about 3, an hourly liquid space velocity (volume of oil per hour per volume of catalyst in the reaction zone) of about 2 and a pressure of 500 pounds per square inch gauge.

This operation produced a yield of 87.3% by weight of a debutanized reformate having an A. S. T. M. Motor Method clear octane number of 75.6 which, upon the addition of 3 cc. of tetraethyl lead, increased to 85.6 and an A. S. T. M. Research Method clear octane number of 85.8 which, upon the addition of 3 cc. of tetraethyl lead, increased to 95.7. The per cent of aromatics in the product amounted to 51.9%.

EXAMPLE II

The catalyst as described in the above example was compared with a conventional catalyst which was prepared in substantially the same manner except that the aluminum chloride hexahydrate was not heated and decomposed prior to precipitation with ammonium hydroxide to form alumina. The amount of chlorine present in the alumina after the final washing and filtration step was determined both for the catalyst as prepared in Example I and for the catalyst as prepared by conventional methods. It was found that the chlorine in the catalyst of Example I amounted to 0.03%, whereas the chlorine in the conventional catalyst was somewhat above 0.05%. It will be seen that, not only is the washing and filtration quicker by the novel features of the present invention, but also that the alumina may be more thoroughly washed by this method in order to produce an alumina containing a lower chlorine concentration.

The results as hereinbefore set forth in Example I for the reforming of the Mid-Continent naphtha are substantially the same as those obtained with the catalyst prepared from aluminum chloride hexahydrate which had not previously been heated and decomposed. This shows that the catalyst of the present invention is as good as the other catalyst but that the washing and filtration operation is effected in a considerably shorter time which, as hereinbefore set forth, is extremely important from a commercial view point.

I claim as my invention:

1. A process for preparing alumina which comprises heating aluminum chloride hexahydrate at a temperature of from about 225° to 600° F. for a period of time such as to liberate only a portion of its chlorine content, commingling a basic reagent with the resultant chlorine-containing residue to form aluminum hydroxide, washing and filtering the latter and then calcining to produce the oxide.

2. A process for preparing alumina which comprises heating aluminum chloride hexahydrate at a temperature of from about 225° to 600° F. for a period of time such as to liberate only a portion of its chlorine content, commingling ammonium hydroxide with the resultant chlorine-containing residue to form aluminum hydroxide, washing and filtering the latter and then calcining to produce the oxide.

3. A process for preparing alumina which comprises heating aluminum chloride hexahydrate at a temperature of from about 225° to 600° F. for a period of time such as to liberate only a portion of its chlorine content, treating the resultant chlorine-containing residue with concentrated ammonium hydroxide, then adding water and mixing, filtering the resultant slurry and washing with water containing a small amount of ammonium hydroxide, and then calcining to form aluminum oxide.

VLADIMIR HAENSEL.

References Cited in the file of this patent

UNITED STATES PATENTS

| Number | Name | Date |
|---|---|---|
| 1,337,192 | Buchner | Apr. 20, 1920 |
| 2,189,376 | Burman | Feb. 6, 1940 |
| 2,413,709 | Hoffman | Jan. 7, 1947 |
| 2,443,285 | Webb et al. | June 15, 1948 |
| 2,479,109 | Haensel | Aug. 16, 1949 |
| 2,479,110 | Haensel | Aug. 16, 1949 |

FOREIGN PATENTS

| Number | Country | Date |
|---|---|---|
| 657,444 | France | May 22, 1929 |